United States Patent [19]

Esser et al.

[11] 4,390,773

[45] Jun. 28, 1983

[54] CONTACT ELECTRODE FOR MELTING AND HEATING FURNACES WITH DC PLASMA HEATING

[76] Inventors: Fred Esser, Wettiner Str. 9, DDR-7010 Leipzig; Detlev Klöpper, E.-Schubert-Str. 20, DDR-7024 Leipzig; Walter Lachner, Schlüterstr. 20, DDR-8021 Dresden; Gerhard Scharf, Lotzestr. 4, DDR-8027 Dresden, all of German Democratic Rep.

[21] Appl. No.: 231,606

[22] Filed: Feb. 5, 1981

[51] Int. Cl.³ .......................... H05H 1/00; B23K 1/00
[52] U.S. Cl. .......................... 219/121 PR; 219/121 P; 219/121 PA; 373/18; 315/111.21
[58] Field of Search ................. 219/121 PA, 121 PY, 219/121 PM, 121 PR, 121 PP, 121 PV, 121 PB, 121 P; 204/164; 13/2 P; 315/111.2; 373/18-22

[56] References Cited

U.S. PATENT DOCUMENTS

| | | | |
|---|---|---|---|
| 3,197,539 | 7/1965 | Hinds | 13/2 P |
| 3,894,573 | 7/1975 | Paton et al. | 219/121 PA |
| 3,899,628 | 8/1975 | Hirt | 13/2 P |
| 4,129,742 | 12/1978 | Ward | 13/2 P |
| 4,263,468 | 4/1981 | Primke et al. | 13/2 P |

*Primary Examiner*—M. H. Paschall
*Attorney, Agent, or Firm*—Gabriel P. Katona

[57] ABSTRACT

The invention relates to a metallurgical plasma melting furnace used for the melting of metals and alloys wherein at least one auxiliary start-up burner for liquid or gaseous fuels is so arranged adjacent to each plasma burner that the hot combustion gases enter into the plasma melting furnace through the same opening in the sidewall of the furnace vessel and melt a crater into the charge material in front of the plasma burner. After the crater has reached a sufficient size, the plasma burners can be reliably operated industrially.

1 Claim, 1 Drawing Figure

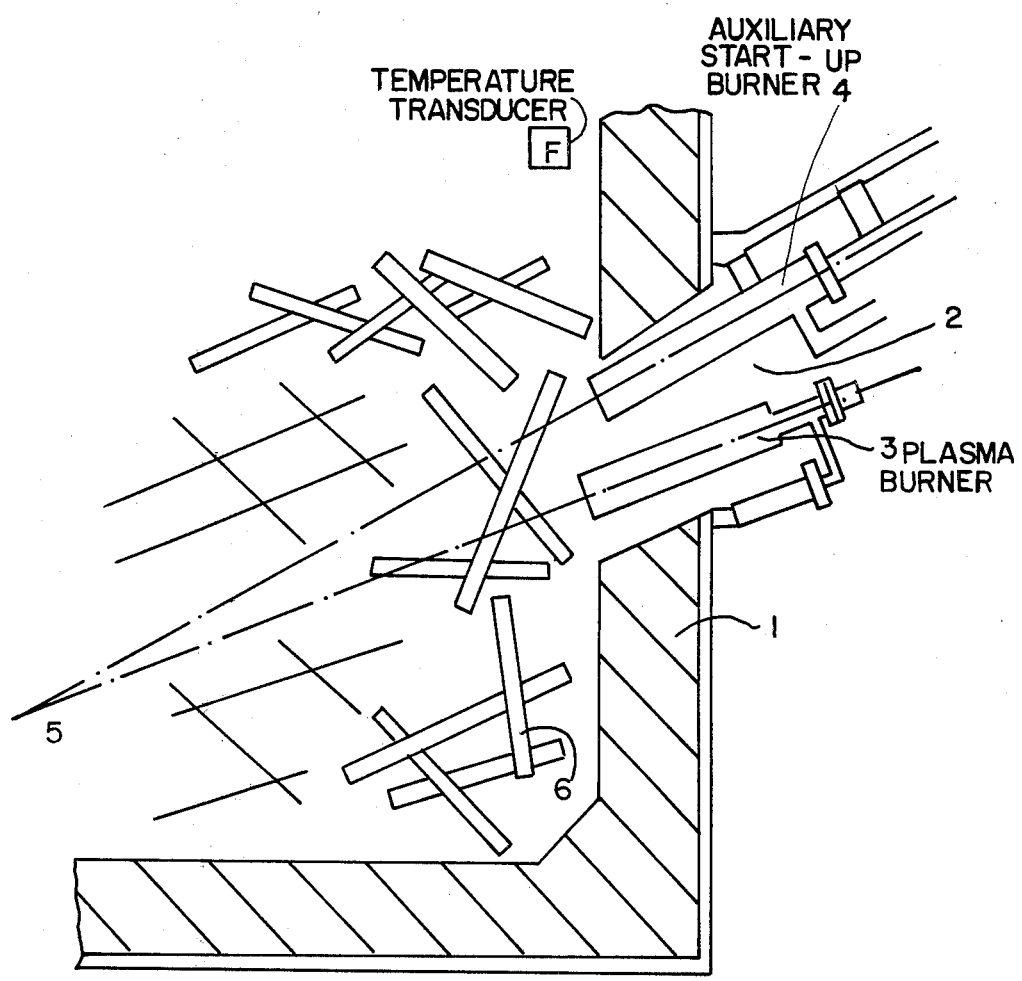

CONTACT ELECTRODE FOR MELTING AND HEATING FURNACES WITH DC PLASMA HEATING

BACKGROUND OF THE INVENTION

The present invention relates to a metallurgical plasma melting furnace having burners as starting aids for the plasma burners for the melting of metals and alloys, the furnance being charged predominantly with light scrap.

It is already known to use plasma burners with transferred low-temperature-gas plasma for the melting of metals and alloys. These plasma burners operate in preferably cylindrical furnace vessels and are preferably arranged in openings in the sidewalls of the plasma melting furnace. Since the energy given off by a plasma burner increases with the length of the plasma burner, in the known industrial solutions the scrap is introduced into the furnace in such a manner that the burner lies above the pile of scrap and is not covered by the charge material. This is, in general, only obtained with charge material of high bulk density, so-called coarse scrap. Upon the melting down of scrap of low bulk density, so-called light scrap, practically the entire volume of the furnace vessel must be filled with light scrap upon the charging in order to obtain a sufficient amount of liquid metal after the melting down. As a result of this high level of filling, the plasma burners, if technically reliable operation thereof is to be possible at all, can operate only with strongly reduced output until the scrap has been sufficiently melted away in front of the plasma burner. The reason for operation with reduced output resides in the physical nature of the transferred plasma arc. For a given arc current the arc voltage, and thus the energy converted, are a function of the length of the plasma burner. If the plasma burner cannot be fully formed due to solid material which limits its length, the energy transferred is also limited thereby. Only after the plasma burner has melted down a sufficiently large crater, can it operate with optimum output.

It has furthermore been known to increase the melting power of arc furnaces by using additional liquid or gaseous fuel burners. Practical experience has shown that these additional burners ignite completely independently of the position of the charge material and the degree of covering of the burners and can be operated with maximum burner output. However, there is the disadvantage that these additional burners supply a considerable proportion of the energy required for the melting, so that the advantage of arc furnaces, namely independence from liquid or gaseous fuels, is lost to a great extent.

SUMMARY OF THE INVENTION

The object of the present invention is to develop a metallurgical plasma melting furnace which makes it possible, regardless of the nature of the charge material, to operate, even shortly after the start of the melting, with the full output of the plasma burners, by melting the charge material near the plasma burners in such a manner with auxiliary start-up burners that he plasma burner can expand in an optimal manner. In this connection the auxiliary start-up burners should melt only a small part of the charge material so that the greatest part of the energy required for the melting comes from the electrically operated plasma burner.

The present invention refers to an electric plasma melting furnace for the melting of metals and alloys which, by the installation of auxiliary start-up burners is able, contrary to known plasma melting furnaces, to economically melt charge materials of low bulk density. In accordance with the invention, at least one start-up burner for liquid or gaseous fuel is present alongside each plasma burner in a metallurgical plasma melting furnace having laterally arranged plasma burners. The auxiliary start-up burners are arranged in such a manner that the hot combustion gases enter into the inside of the plasma melting furnace through the same opening in the sidewall of the furnace vessel and that the axes of the plasma burner and its corresponding start-up burner form only a small angle with each other and intersect within the plasma melting furnace.

Upon the operation of the metallurgical plasma melting furnace, the auxiliary-start-up burners are ignited after the charging. These burners immediately operate with full efficiency, each of them melting a crater in the charge material, the melting taking place faster as the bulk density of the charge material decreases, as a result of the smaller amount of heat required. When the molten crater has acquired a size which is sufficient in order that the plasma burner can be industrially operated dependably, the plasma burner is ignited. The auxiliary start-up burners are disconnected at the latest when the formation of the crater has been concluded, the flue gas does not transmit any significant heat to the piled charge material and the off-gas temperatures definitely increase.

BRIEF DECRIPTION OF THE DRAWING

The invention will be described in further detail below with reference to an illustrative embodiment on the basis of the appended diagrammatic FIGURE which is a cross section the the plasma melting furnace at one opening.

DETAILED DESCRIPTION OF THE INVENTION

The FIGURE shows an opening 2 in sidewall 1 of a plasma melting furnace. The other openings are completely analogous to the opening 2. An ordinary plasma burner 3 is arranged in known manner in the opening 2. Over this plasma burner 3 there is arranged an auxiliary start-up burner 4 which is operated with liquid or gaseous fuel. The longitudinal axes of the plasma burner 3 and of the auxiliary start-up burner 4 intersect at the point of intersection 5. After the charging, the plasma melting furnace is filled with light scrap 6. Thereupon the auxiliary start-up burner 4 is placed in operation. After the action of the auxiliary start-up burner 4 has produced a crater which is large enough that the plasma burner 3 can be dependably ignited, the latter enters into operation. The auxiliary start-up burner 4 is turned off when the plasma burner 3 is operating at full efficiency and the off-gas temperature has reached a given value as measured by temperature transducer F which produces a corresponding measuring signal. Thereafter the plasma melting furnace operates in the known manner.

We claim:

1. In a metallurgical plasma melting furnace for the melting of metals and alloys, having at least one plasma burner having a longitudinal axis mounted in a furnace sidewall port, the improvement comprising at least one start-up burner having a longitudinal axis for each of said at least one plasma burners, the start-up burner mounted in the same port as its associated plasma burner and alongside same with said longitudinal axes of the start-up burner and associated plasma burner intersecting within the furnace and forming an acute angle at the point of intersection.

* * * * *